(12) United States Patent
Rossbach

(10) Patent No.: US 8,502,989 B1
(45) Date of Patent: Aug. 6, 2013

(54) TOMOGRAPHIC OPTICAL BEAM IRRADIANCE SENSOR

(75) Inventor: Dennis R. Rossbach, Corrales, NM (US)

(73) Assignee: The Boeing Company, Chicago, IL (US)

( * ) Notice: Subject to any disclaimer, the term of this patent is extended or adjusted under 35 U.S.C. 154(b) by 142 days.

(21) Appl. No.: 13/231,913

(22) Filed: Sep. 13, 2011

(51) Int. Cl.
*G01B 11/14* (2006.01)
(52) U.S. Cl.
CPC ..................................... *G01B 11/14* (2013.01)
USPC .......................................... 356/614; 356/623
(58) Field of Classification Search
CPC ...................................................... G01B 11/14
USPC .................................................. 356/614–625
See application file for complete search history.

(56) References Cited

U.S. PATENT DOCUMENTS

| 5,678,556 A * | 10/1997 | Maki et al. ..................... 600/477 |
| 2012/0062872 A1 * | 3/2012 | Strembicke et al. ............ 356/72 |

* cited by examiner

*Primary Examiner* — Michael P Stafira
(74) *Attorney, Agent, or Firm* — Ameh IP; Elahe Toosi; Lowell Campbell

(57) ABSTRACT

A tomographic optical beam irradiance sensor is disclosed. An optical medium receives an incident beam at a plurality of incident points in the optical medium. A first angular optical sensor assembly senses a first set of ray angles and intensities of a plurality of scatter rays emitted from the incident points. A second angular optical sensor assembly senses a second set of ray angles and intensities of the scatter rays emitted from the incident points. A tomography module determines a plurality of locations and intensities of the incident points in the optical medium based on the first set of ray angles and intensities and the second set of ray angles and intensities.

20 Claims, 9 Drawing Sheets

TOMOGRAPHIC OPTICAL BEAM IRRADIANCE SENSOR

FIELD

Embodiments of the present disclosure relate generally to electro-optics. More particularly, embodiments of the present disclosure relate to electro-optic devices.

BACKGROUND

Measuring an irradiance of an incident beam on a target object, and reconstruction of an irradiance pattern was previously accomplished by use of a two-dimensional (2-D) detector matrix device. The 2-D detector matrix device may be placed on the target object, and receive the incident beam directly. The incident beam is measured at locations on the 2-D detector matrix device. Manufacturing complexity makes systems for directly receiving the incident beam using the 2-D detector matrix device expensive with a long lead time.

Alternatively, a reflected beam may be reflected from the target object receiving the incident beam, and received by the 2-D detector matrix device. The reflected beam is measured at locations on the 2-D detector matrix device as a representation of the incident beam. A location for the 2-D detector matrix device must be provided that is not co-planar with a sensed region of the target object, which may be difficult for an object like a missile due to aerodynamics. Furthermore, other target objects may be difficult because the 2-D detector matrix device may interfere with the reflected beam of the target object.

SUMMARY

A tomographic optical beam irradiance sensor is disclosed. An optical medium receives an incident beam at a plurality of incident points in the optical medium. A first angular optical sensor assembly senses a first set of ray angles and intensities of a plurality of scatter rays emitted from the incident points. A second angular optical sensor assembly senses a second set of ray angles and intensities of the scatter rays emitted from the incident points. A tomography module determines a plurality of locations and intensities of the incident points in the optical medium based on the first set of ray angles and intensities and the second set of ray angles and intensities.

In this manner, embodiments of the disclosure provide a telecentric optical system that assures that scatter from adjacent angular regions does not reach a detector for a particular angular direction. Blocking scatter from adjacent angular regions is important to an accuracy of the technique. Embodiments of the disclosure read out data in a configuration that is particularly convenient for telemetry, and for which detector assemblies are substantially easy to manufacture.

In an embodiment, a tomographic optical beam irradiance sensor system comprises an optical medium, a first angular optical sensor assembly, a second angular optical sensor assembly, and a tomography module. The optical medium is operable to receive an incident beam at a plurality of incident points in the optical medium. The first angular optical sensor assembly is operable to sense a first set of ray angles and intensities of a plurality of scatter rays emitted from the incident points. The second angular optical sensor assembly is operable to sense a second set of ray angles and intensities of the scatter rays emitted from the incident points. The tomography module is operable to determine a plurality of locations and intensities of the incident points in the optical medium based on the first set of ray angles and intensities and the second set of ray angles and intensities.

In another embodiment, a method for optical detection receives an incident beam at a plurality of incident points in an optical medium, and emits a first set of scatter rays from the incident points in response to receiving the incident beam. The method further receives the first set of scatter rays at a first angular optical sensor assembly, and determines a first set of ray angles and intensities of the first set of scatter rays at the first angular optical sensor assembly. The method further emits a second set of scatter rays from the incident points in response to receiving the incident beam, and receives the second set of scatter rays at a second angular optical sensor assembly. The method further determines a second set of ray angles and intensities of the second set of scatter rays at the second angular optical sensor assembly. The method further determines a plurality of locations and intensities of the incident points in the optical medium based on the first set of ray angles and intensities, and the second set of ray angles and intensities.

In yet another embodiment, a method for providing a tomographic optical beam irradiance sensor system provides an optical medium operable to receive an incident beam at a plurality of incident points in the optical medium. The method further provides a first angular optical sensor assembly operable to sense a first set of ray angles and intensities of a plurality of scatter rays emitted from the incident points. The method further provides a second angular optical sensor assembly operable to sense a second set of ray angles and intensities of the scatter rays emitted from the incident points. The method further provides a tomography module operable to determine a plurality of locations and intensities of the incident points in the optical medium based on the first set of ray angles and intensities and the second set of ray angles and intensities.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

Figure 1:
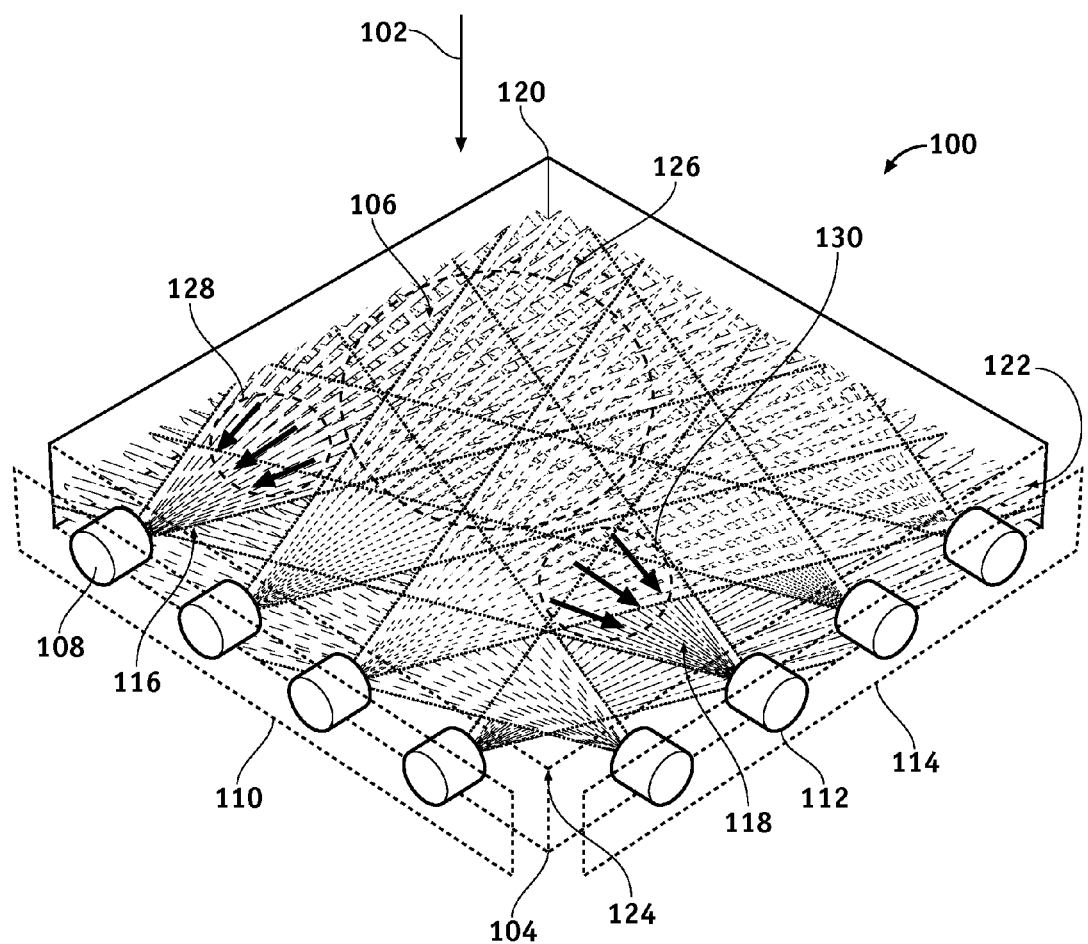
FIG. 1 is an illustration of an exemplary tomographic optical beam irradiance sensor system according to an embodiment of the disclosure.

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to optical sensors, optical lenses, tomography techniques, and other functional aspects of systems described herein (and the individual operating components of the systems) may not be described in detail herein. In addition, those skilled in the art will appreciate that embodiments of the present disclosure may be practiced in conjunction with a variety of hardware and software, and that the embodiments described herein are merely example embodiments of the disclosure.

Embodiments of the disclosure are described herein in the context of a practical non-limiting application, namely, optical detection. Embodiments of the disclosure, however, are not limited to such optical detection applications, and the techniques described herein may also be utilized in other applications. For example but without limitation, embodiments may be applicable to neutrino detection, cosmic ray detection, submarine detection, and the like.

As would be apparent to one of ordinary skill in the art after reading this description, the following are examples and embodiments of the disclosure and are not limited to operating in accordance with these examples. Other embodiments may be utilized and structural changes may be made without departing from the scope of the exemplary embodiments of the present disclosure.

Embodiments of the disclosure provide a system and methods for measuring an irradiance of an incident beam (e.g., a light beam), and reconstruction of an irradiance pattern to detect an incident beam profile. Embodiments of the disclosure utilize a material which is partially transparent to an electromagnetic (EM) radiation at an operating wavelength. The material may comprise scattering (or fluorescing) centers which scatter or emit light at the operating wavelength or at an anti-stokes energy-converted sensing wavelength. The light is sensed by an array of angular optical sensor assemblies that provides multiple angular profile "slices" suitable for tomographic reconstruction. The angular profile "slices" may be obtained by statically sensing light at angles or by motion of the sensing system components where tomographic sensors used have a telecentric or nearly telecentric configuration to avoid issues with regional scatter.

Embodiments of the disclosure utilize tomographic reconstruction techniques to determine the incident beam profile. A technique for using volumetric scatter or absorption in a tomographic sensing region is provided herein. The incident beam is scattered into tomographic sensor assemblies, up-converted to a wavelength that is scattered into the tomographic sensor assemblies, or for which a medium provides absorption of a light profile. Absorption of the light profile may be by electro-optically or thermo-optically changing absorptivity of the medium. Use of telecentric optical systems assures that scatter from adjacent regions does not reach photodetectors of the tomographic sensor assemblies for a particular angular direction.

A tomographic optical beam irradiance sensor system is disclosed. An optical medium is configured to receive an incident beam (2-D incident beam) at a plurality of incident points in the optical medium. A first set of angular optical sensor assemblies is configured to sense a first set of ray angles and intensities of scattered rays from only a specific angular region of the optical medium for each of the first set of optical sensor assemblies in a collection of incident points. A second set of angular optical sensor assemblies is configured to sense a second set of specific ray angles and intensities of the scattered rays from only another specific angular region of the optical medium for each of the second set of optical sensor assemblies in the collection of the incident points. The scattered radiation is an integral (or sum along a direction) of scatter from the 2-D incident beam along a singular direction for specific angles of the sets of angular optical sensor assemblies.

Alternatively, one may interpret a general 2-D incident beam as being composed of a number of small "rays". Each "ray" produces an angular positional response that may be triangulated to determine a location. When a multiplicity of such rays comprising a 2-D incident beam is incident, each detector in a detector array receives a sum of signals from an entire set of "rays" in their individual angular directions. Embodiments invert such a distribution by using a Radon Transform. A tomography module which performs the transform is configured to determine locations/intensities of the incident beam in the optical medium based on the transform of the first set of ray angles and intensities and the second set of ray angles and intensities. For remote operation, the tomography module may be located remotely from the sets of angular optical sensor assemblies.

FIG. 1 is an illustration of an exemplary tomographic optical beam irradiance sensor system 100 (system 100) according to an embodiment of the disclosure. The system 100 comprises an optical medium 104, a first angular optical sensor assembly array 110 (sensor assembly array 110) comprising a first angular optical sensor assembly 108, a second angular optical sensor assembly array 114 (sensor assembly array 114) comprising a second angular optical sensor assembly 112, and a substantially non-reflecting background 120.

The optical medium 104 receives an incident beam 102 at a plurality of incident points 126. The optical medium 104 scatters optical rays from the incident points 126 in response to receiving the incident beam 102. The optical medium 104 may be operable to scatter an optical ray at a scatter ray frequency that is different from an incident beam frequency of the incident beam 102. The optical medium 104 may be coupled to a test surface (not shown) comprising, for example but without limitation, a missile skin, an aircraft skin, a ship surface, and the like.

The optical medium 104 may comprise, for example but without limitation, an acrylic medium, a fused silica medium, a scattering medium, a fogged scattering medium, a particulate comprising scattering medium, an ion-implanted scattering medium, an absorptive medium, an anti-stokes conversion medium, or other medium. The incident beam 102 may comprise, for example but without limitation, a laser beam, a microwave beam, an x-ray beam, a gamma ray beam, a radiation, a cosmic ray, a neutrino, an underwater light, and the like.

In an embodiment, the optical medium 104 comprises a thin planar detector surface. Alternatively, a curved detector surface can be used for the optical medium 104 to form curved sensing regions where total internal reflection properties of a material of the curved detector surface guide light over the curved sensing regions.

The first angular optical sensor assembly 108 and the second angular optical sensor assembly 112 each comprise a detector array 208/508 (FIGS. 2, 3, 4, and 5) operable to detect a received light ray. The first angular optical sensor assembly 108 is configured to sense a first set-of-ray angles and intensities 128 of a plurality of scatter rays such as a first set-of-scatter rays 116 and a second set-of-scatter rays 118 emitted (emitted ray) from the incident points 126. The second angular optical sensor assembly 112 is configured to sense a second set-of-ray angles and intensities 130 of the scatter rays 116/118 emitted from the incident points 126. The first angular optical sensor assembly 108 and the second angular optical sensor assembly 112 each comprise a telecentric lens 206 (FIG. 2) operable to direct a received light (received ray) to a photo-detector of the detector array 208/508 (FIGS. 2, 3, 4, and 5) corresponding to a direction of the received ray.

In this manner, the first angular optical sensor assembly 108 and the second angular optical sensor assembly 112 each can simultaneously sense many directions of the received rays. The first angular optical sensor assembly 108 and the second angular optical sensor assembly 112 also each comprise an aperture (204 in FIG. 2) operable to collimate light rays. The aperture 204 is placed at a first focal surface of the telecentric lens 206 to assure an entrance pupil is telecentric (i.e., is substantially located at infinity).

The first angular optical sensor assembly array 110 and the second angular optical sensor assembly array 114 each represent a sensor assembly comprising angular optical sensor assemblies such as the angular optical sensor assemblies 108 and 112 at locations along each sensor assembly array 110/114 corresponding to a direction of the received light. The locations determine angles of scatter rays received through an angular optical sensor system 200 (in FIG. 2).

For example, the first set of scatter rays 116 such as a left-angled scatter ray 302 (FIG. 3) from the incident points 126 may be received at an angle of the first set of ray angles and intensities 128 such as a ray angle 320 (FIG. 3) at the first angular optical sensor assembly 108. The second set of scatter rays 118 such as a right-angled scatter ray 402 (FIG. 4) from the incident points 126 may be received at an angle of the second set of ray angles and intensities 130 such as a ray angle 420 (FIG. 4) at the second angular optical sensor assembly 112. A location of the incident points 126 of the incident beam 102 in the optical medium 104 can be determined based on the ray angle 320 and the ray angle 420.

While each "ray" produces an angular positional response that may be triangulated to determine a location and intensity of an incident point 106 among the incident points 126 as explained above. When a multiplicity of such rays is incident, the first angular optical sensor assembly array 110 and the second angular optical sensor assembly array 114 may receive a sum of the signals from the entire set of "rays" though their respective angular optical sensor assemblies 108/112 in their individual angular directions 128 and 130 respectively. Scattered rays are all "on" simultaneously and scatter from other "rays" is present in each. Therefore, an entire suite of angles may be used to reconstruct a density of the incident beam 102. The incident beam 102 may comprise a large number of incident "rays" that emit scatter rays such as the first set of scatter rays 116 from incident points 126 each having a location and intensity.

As mentioned above, a Radon inversion (transform) may be used to reconstruct a density of the incident beam 102 by determining locations and intensities of the incident points 126 in the optical medium 104. Radon inversion comprises a matrix inversion technique for a discrete set of angle and intensity measurements from a set of detectors such as the detector array 208/508 of the first angular optical sensor assembly 108 and the second angular optical sensor assembly 112 described herein. A tomography module 624 (FIG. 6) performs the Radon inversion of the sensed field of the incident points 126 and determines locations and intensities of the incident points 126 in the optical medium 104. The locations and intensities of the incident points 126 in the optical medium 104 are determined by the Radon inversion based on a transform of angle sets such as the first set of ray angles and intensities 128 and the second set of ray angles and intensities 130.

The substantially non-reflecting background 120 comprises a non-reflecting material. The substantially non-reflecting background 120 may be used to prevent reflections of scatter rays such as a scatter ray 122 from creating ghost points, and/or interfering with received scatter rays.

Figure 2:
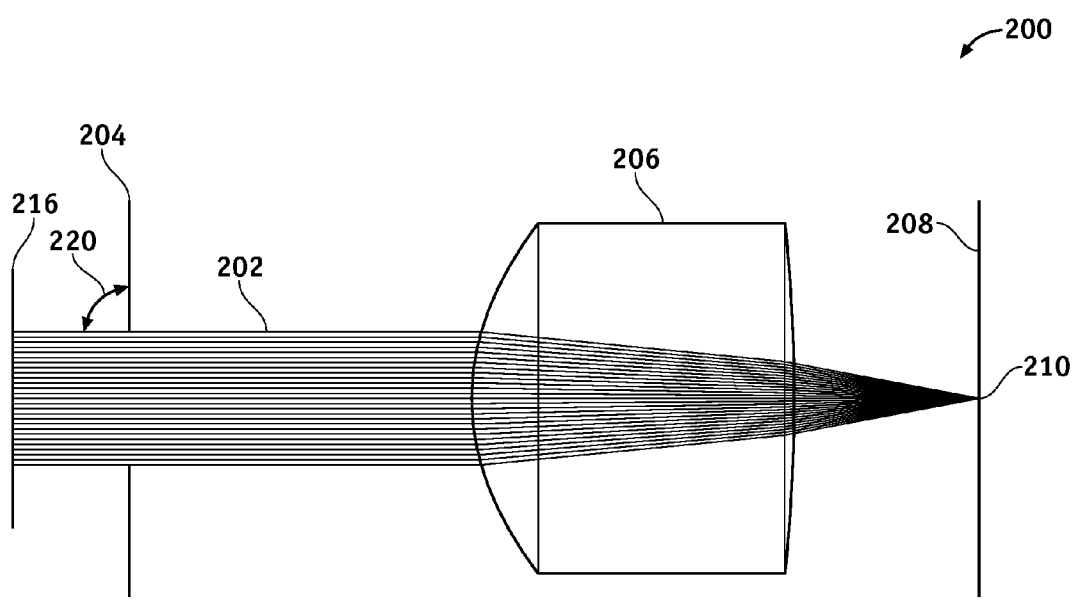
FIG. 2 is an illustration of an exemplary angular optical sensor assembly according to an embodiment of the disclosure.

FIG. 2 is an illustration of an exemplary angular optical sensor assembly 200 (assembly 200) (108/112 in FIG. 1) according to an embodiment of the disclosure. The assembly 200 comprises an aperture 204, a telecentric lens 206, and the detector array 208. The assembly 200 receives a scatter ray 202 from an optical medium 216 (104 in FIG. 1). The scatter ray 202 is focused by the telecentric lens 206 in a telecentric manner such that the scatter ray 202 focuses on a detector array 210 corresponding to a ray angle 220 of the scatter ray 202. The ray angle 220 may be measured relative to, for example but without limitation, the aperture 204, the optical medium 216, the telecentric lens 206, and the like. A telecentric lens is operable to direct a received ray of the scatter rays to a sensor corresponding to a direction of the received ray.

Figure 3:
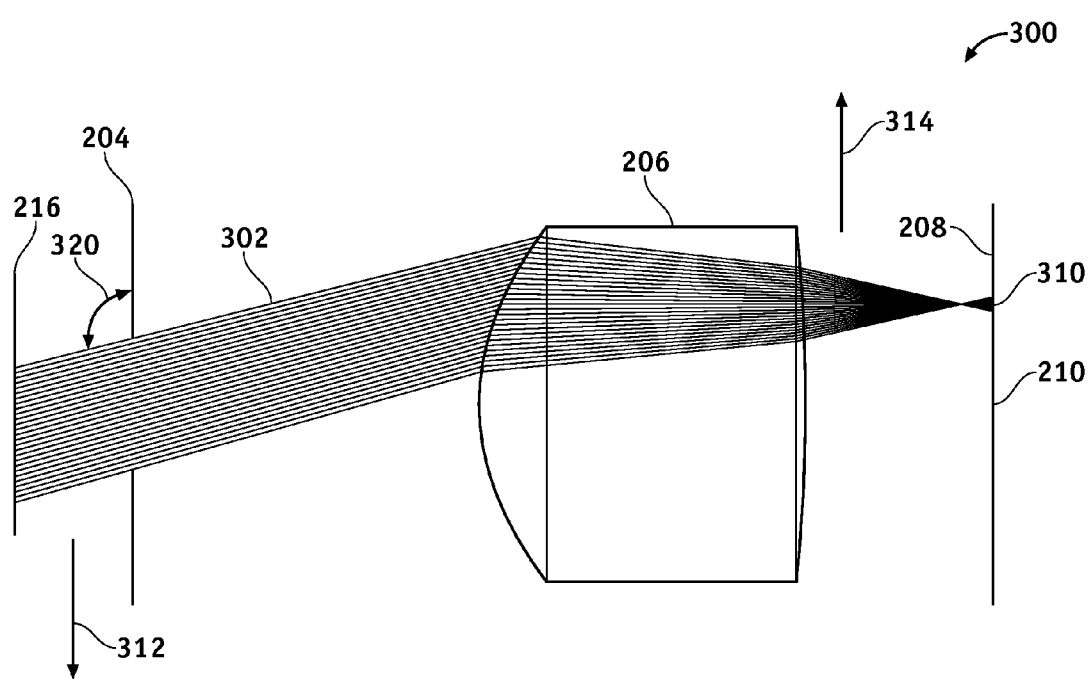
FIG. 3 is an illustration of an exemplary angular optical sensor assembly showing detection of a port direction angled light according to an embodiment of the disclosure.

FIG. 3 is an illustration of an exemplary angular optical sensor assembly 300 (assembly 300) (108, 112 in FIG. 1) showing detection of the left-angled scatter ray 302 (port direction angled light) according to an embodiment of the disclosure. The assembly 300 comprises the aperture 204, the telecentric lens 206, and the detector array 208 of FIG. 2. The assembly 300 receives the left-angled scatter ray 302 from the optical medium 216 at the ray angle 320 tilted in a direction 312 relative to the aperture 204. The left-angled scatter ray 302 is focused by the telecentric lens 206 in a telecentric manner such that the left-angled scatter ray 302 focuses on a second detector 310 corresponding to the ray angle 320. The ray angle 320 may be measured relative to, for example but without limitation, the aperture 204, the optical medium 216, the telecentric lens 206, or other reference location.

Figure 4:
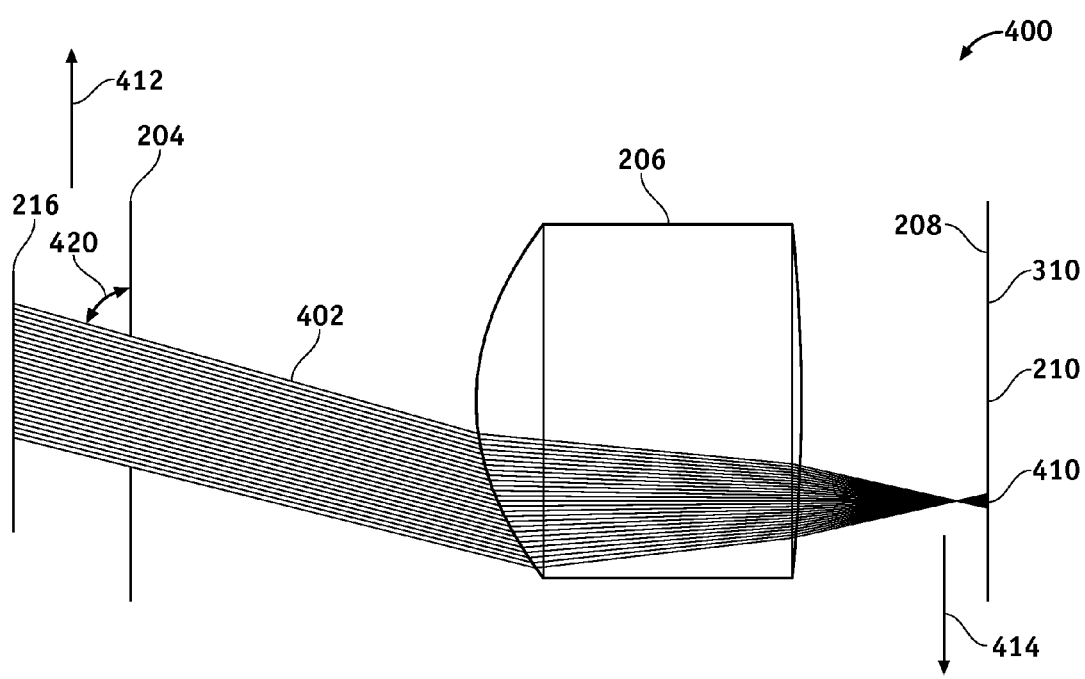
FIG. 4 is an illustration of an exemplary angular optical sensor assembly showing detection of a starboard direction angled light according to an embodiment of the disclosure.

FIG. 4 is an illustration of an exemplary angular optical sensor assembly 400 (assembly 400) (108, 112 in FIG. 1) showing detection of the right-angled scatter ray 402 (starboard direction angled light) according to an embodiment of the disclosure. The assembly 400 comprises the aperture 204, the telecentric lens 206, and the detector array 208 of FIG. 2. The assembly 400 receives the right-angled scatter ray 402 from the optical medium 216 at a ray angle 420 tilted in a direction 412 relative to the aperture 204. The right-angled scatter ray 402 is focused by the telecentric lens 206 in a telecentric manner such that the right-angled scatter ray 402 focuses on a third detector 410 corresponding to the ray angle 420. The ray angle 420 may be measured relative to, for example but without limitation, the aperture 204, the optical medium 216, the telecentric lens 206, and the like.

Figure 5:
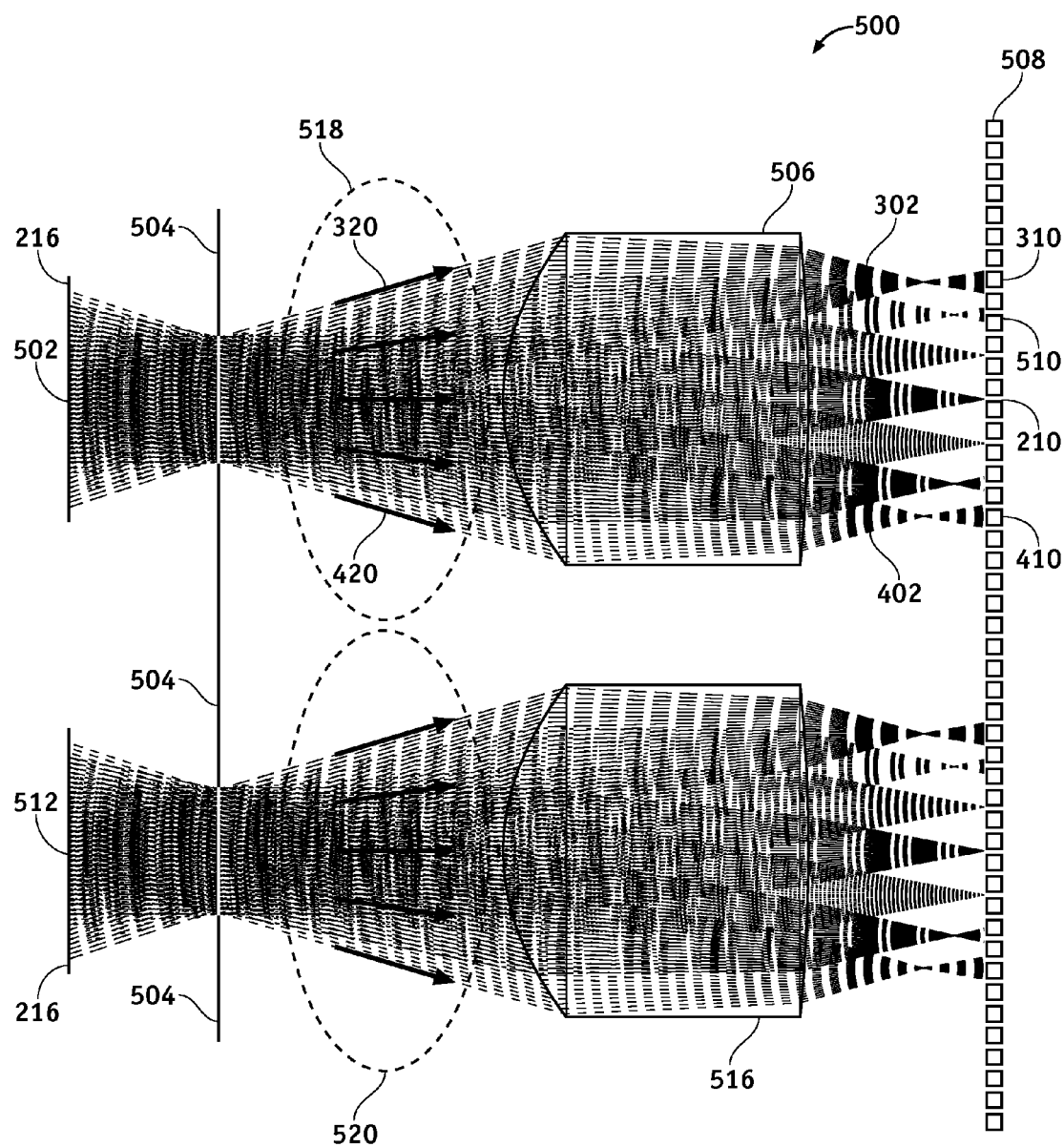
FIG. 5 is an illustration of an exemplary optical assembly according to an embodiment of the disclosure.

FIG. 5 is an illustration of an exemplary optical assembly 500 according to an embodiment of the disclosure. A plurality of scatter rays such as scatter rays 502 and scatter rays 512 can be substantially simultaneously received through an aperture 504, and collimated by the aperture 504. A telecentric lens 506 focuses the scatter rays 502 on the photo-detector array 508. A plurality of scatter rays 512 can be substantially simultaneously received through the aperture 504, and collimated by the aperture 504. A telecentric lens 516 focuses the scatter rays 502 on the photo-detector array 508. Places where the scatter rays 502 and the scatter rays 512 focus on the photo-detector array 508 such as a sensor 510 and a sensor 514 sense a grid of the incident points 126 in the optical medium 104 (FIG. 1). Thus, each of the incident points 126 such as the incident point 106 can be detected, located, and an intensity at the location determined.

In this manner, embodiments of the disclosure provide a system that detects an incident optical beam profile. The present embodiment comprises a thin planar region such as the optical medium 104, shown in FIG. 1 in which the incident beam 102 is scattered by scattering centers. Such an arrangement scatters energy proportional to a local scatter density and a local irradiance into detectors such as the first angular optical sensor assembly 108 and the second angular optical sensor assembly 112 each on a side of the system 100. In the embodiment shown in FIG. 1, the first angular optical sensor assembly array 110 comprises four of the angular optical sensor assemblies 108, and the second angular optical sensor assembly array 114 comprises four of the angular optical sensor assemblies 112. Alternatively, several thousand angular optical sensor assemblies 108/112 may be used per each angular optical sensor assembly array 110/112 of the system 100.

In a scattered radiation embodiment, an absorbing background such as the non-reflecting background 120 is used. In an up-converting embodiment, energy scattered into the first angular optical sensor assembly array 110 and the second angular optical sensor assembly array 114 is at an anti-stokes wavelength rather than a wavelength of the incident beam 102. In an absorbing or electro optical (E-O) embodiment, a source region is used at the non-reflecting background 120, and an absorption along a "slice" path varies with an incident irradiance.

Data needed for tomographic reconstruction may be obtained by statically sensing at angles (e.g., 320, 420) as shown in optical assembly 500 where individual sets of ray angles 518 and 520 are shown. In this case, a photo-detector element of the photo-detector array 508 is needed for (at least) each angle times the number of elements in the tomographic slice.

The optical assembly 500 is telecentric (an exit pupil is located at or near infinity in image space by virtue of the aperture 504 (aperture stop) being located at a front focal distance of the telecentric lens 506 and the telecentric lens 516 (imaging assembly). Data may also be obtained by rotational motion of the optical assembly 500 components where detectors used comprise a telecentric or near telecentric configuration at a single angle. Combinations of these two techniques could also be used.

As mentioned above, embodiments of the disclosure utilize tomographic reconstruction techniques to reproduce a sampled reconstruction of an incident energy profile of the incident beam 102. While tomographic reconstructions are utilized in x-rays, acoustics, and medical fields, embodiments of the disclosure using volumetric scatter or absorption in a tomographic sensing region are new. Moreover, embodiments using volumetric scatter or absorption in a tomographic sensing region, wherein a beam is scattered into tomographic sensors, or up-converted to a wavelength that is scattered into the tomographic sensors, or for which a medium provides absorption of a light profile by virtue of changing an absorptivity of the medium electro-optically or thermo-optically are new.

Various embodiments of the disclosure comprise an acrylic sheet or a fused silica sheet in which scatterers are incorporated at manufacture (fog, particulate or ion-implantation) with a linear array of optical sensors on two or more sides. Additional directions provide immunity to aberrations in an event that a sheet is bent to conform to a surface and the incident beam 102 internally reflect due to the index shift to the external media or may be used to fill in corner sensing.

Figure 6:
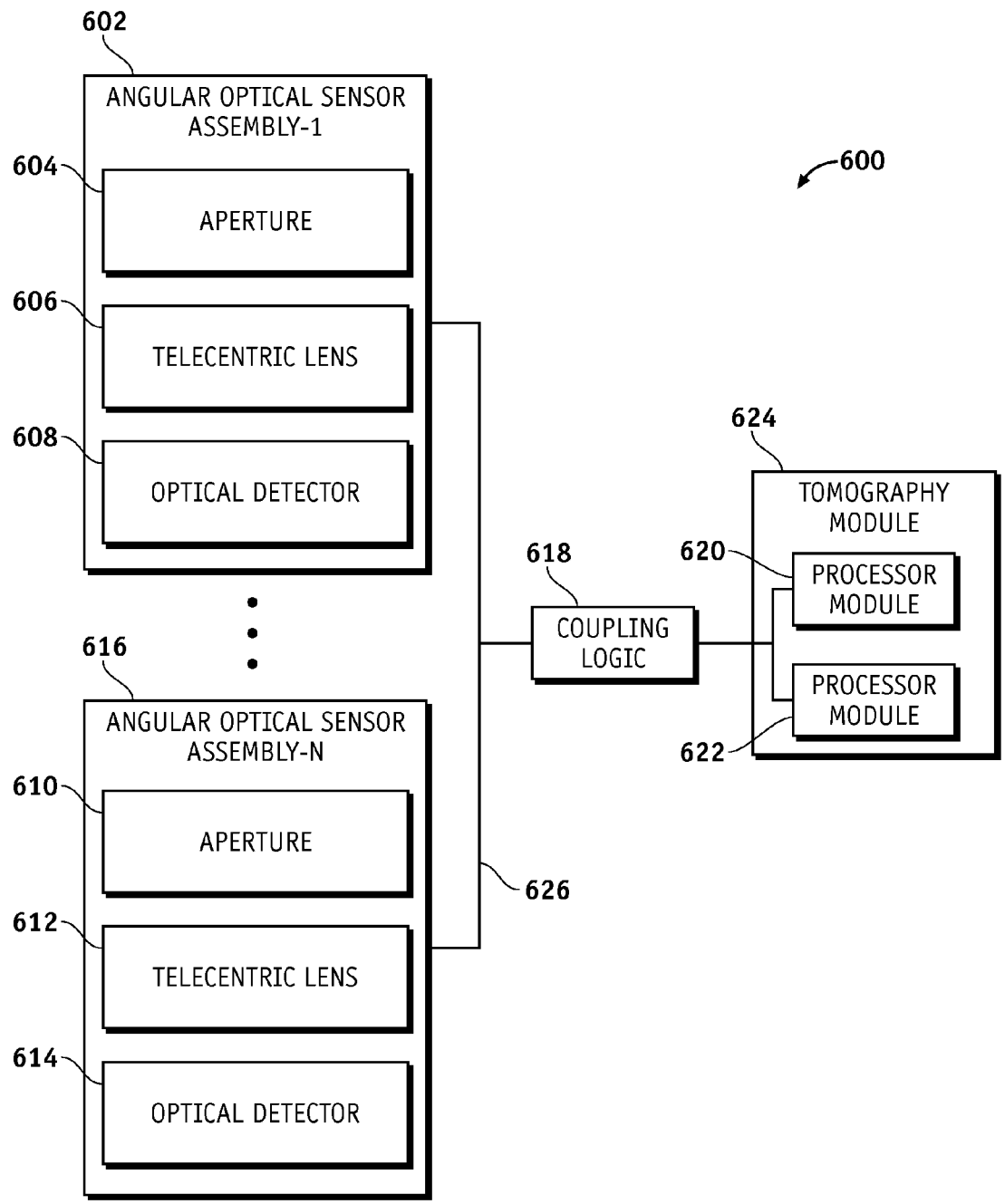
FIG. 6 is an illustration of an exemplary functional block diagram of a tomographic optical beam irradiance sensor system according to an embodiment of the disclosure.

FIG. 6 is an illustration of an exemplary functional block diagram of a tomographic optical beam irradiance sensor system (system 600) according to an embodiment of the disclosure. A practical system 600 may comprise any number of input modules, any number of processor modules, any number of memory modules, and any number of other modules. The illustrated system 600 depicts a simple embodiment for ease of description. These and other elements of the system 600 are interconnected together, allowing communication between the various elements of system 600.

In one embodiment, these and other elements of the system 600 may be interconnected together via a communication link 626. Those of skill in the art will understand that the various illustrative blocks, modules, circuits, and processing logic described in connection with the embodiments disclosed herein may be implemented in hardware, computer-readable software, firmware, or any practical combination thereof.

To illustrate clearly this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as causing a departure from the scope of the present disclosure.

The system 600 may have functions, material, and structures that are similar to the embodiments shown in FIGS. 1-5. Therefore, common features, functions, and elements may not be redundantly described here.

The system 600 may comprise any number of angular optical sensor assemblies 1-N (where N is an integer greater than 1) such as an angular optical sensor assembly-1 602 and an angular optical sensor assembly-N 616 (Nth angular optical sensor assembly), a coupling logic 618, and a tomography module 624. In some embodiments, N may be selected to be four to several thousand indicating number of angular optical sensor assemblies 108/112 used per each angular optical sensor assembly array 110/114 of the system 100.

The angular optical sensor assembly-1 602 comprises an aperture 604, a telecentric lens assembly 606, and an optical detector 608. Similarly, the angular optical sensor assembly-N 602 comprises an aperture 610, a telecentric lens assembly 612, and an optical detector 614. The angular optical sensor assembly-1 602 and the angular optical sensor assembly-N 616 are each configured to receive a scatter ray from one or more of the incident points 126 such as the incident point 106 (FIG. 1).

The coupling logic 618 is configured to communicatively couple the angular optical sensor assembly-1 602 and the angular optical sensor assembly-N 616 to the tomography module 624.

The tomography module 624 is configured to determine a plurality of locations and intensities of the incident points 126 in the optical medium 104 based on the first set-of-ray angles and intensities 128 and the second set-of-ray angles and intensities 130.

The tomography module 624 may perform a Radon inversion to determine locations and intensities of the incident points 126 in the optical medium 104. The incident beam 102 comprises a large number of incident "rays" each having a set of locations and intensities. Because scatter from all the other "rays" is present in each measurement the Radon inversion is used to reconstruct the incident beam 102 intensity. The tomography module 624 determines the direction and intensity of the incident beam 102 by the Radon inversion of the sensed field. The scatter rays emitted from the incident points 126 are all "on" simultaneously, and an entire suite of angles is used for the Radon inversion process. The Radon inversion comprises a matrix inversion technique for a discrete set of sensor assemblies such the first angular optical sensor assembly 108 and the second angular optical sensor assembly 112.

The tomography module 624 comprises a processor module 620, and memory module 622. The tomography module 624 determines a property of the incident beam 102 based on a first scatter ray such as the left-angled scatter ray 302 (FIG. 3) and a second scatter ray such as the right-angled scatter ray 402 (FIG. 4). The property may comprise, for example but without limitation, a location of the incident point 106 in the optical medium 104, a location of the incident beam 102, a temperature of the incident point 106, a spectrum of the incident point 106, or other property.

A third angular optical sensor assembly (not shown) may be operable to sense a third direction of a third scatter ray such as the scatter ray 202 (FIG. 2) from the incident point 106. A first location of the first angular optical sensor assembly 108, a second location of the second angular optical sensor assembly 112, and a third location (not shown) of the third angular optical sensor assembly comprise a triangle in a plane perpendicular to the incident point 106 and non-coplanar with the incident point 106. The tomography module 624 may then determine the property of the incident beam 102 based on the first scatter ray such as the left-angled scatter ray 302 (FIG. 3), the second scatter ray such as the right-angled scatter ray 402 (FIG. 4), and the third scatter ray such as the scatter ray 202 (FIG. 2).

The processor module 620 comprises processing logic that is configured to carry out the functions, techniques, and processing tasks associated with the operation of the system 600. In particular, the processing logic is configured to support the system 600 described herein. The processor module 620 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like.

A processor may also be implemented as a combination of computing devices, e.g., a combination of a digital signal processor and a microprocessor, a plurality of microprocessors, one or more microprocessors in conjunction with a digital signal processor core, or any other such configuration.

The memory module 622 may comprise a data storage area with memory formatted to support the operation of the system 600. The memory module 622 is configured to store, maintain, and provide data as needed to support the functionality of the system 600. For example, the memory module 622 may store a set-of-ray angles and intensities, locations and intensities of the incident points 126, or other data.

In practical embodiments, the memory module 622 may comprise, for example but without limitation, a non-volatile storage device (non-volatile semiconductor memory, hard disk device, optical disk device, and the like), a random access storage device (for example, SRAM, DRAM), or any other form of storage medium known in the art.

The memory module 622 may be coupled to the processor module 620 and configured to store, for example but without limitation, a database, a computer program that is executed by the processor module 620, an operating system, an application program such as the Radon inversion program, tentative data used in executing a program such as the Radon inversion program, and the like. Additionally, the memory module 622 may represent a dynamically updating database containing a table for updating the database, or other applications.

The memory module 622 may be coupled to the processor module 620 such that the processor module 620 can read information from and write information to the memory module 622. For example, as mentioned above, the processor module 620 may access the memory module 622 to access the light spectrums frequency values, and the like.

As an example, the processor module 620 and memory module 622 may reside in respective application specific integrated circuits (ASICs). The memory module 622 may also be integrated into the processor module 620. In an embodiment, the memory module 622 may comprise a cache memory for storing temporary variables or other intermediate information during execution of instructions to be executed by the processor module 620.

Figure 7:
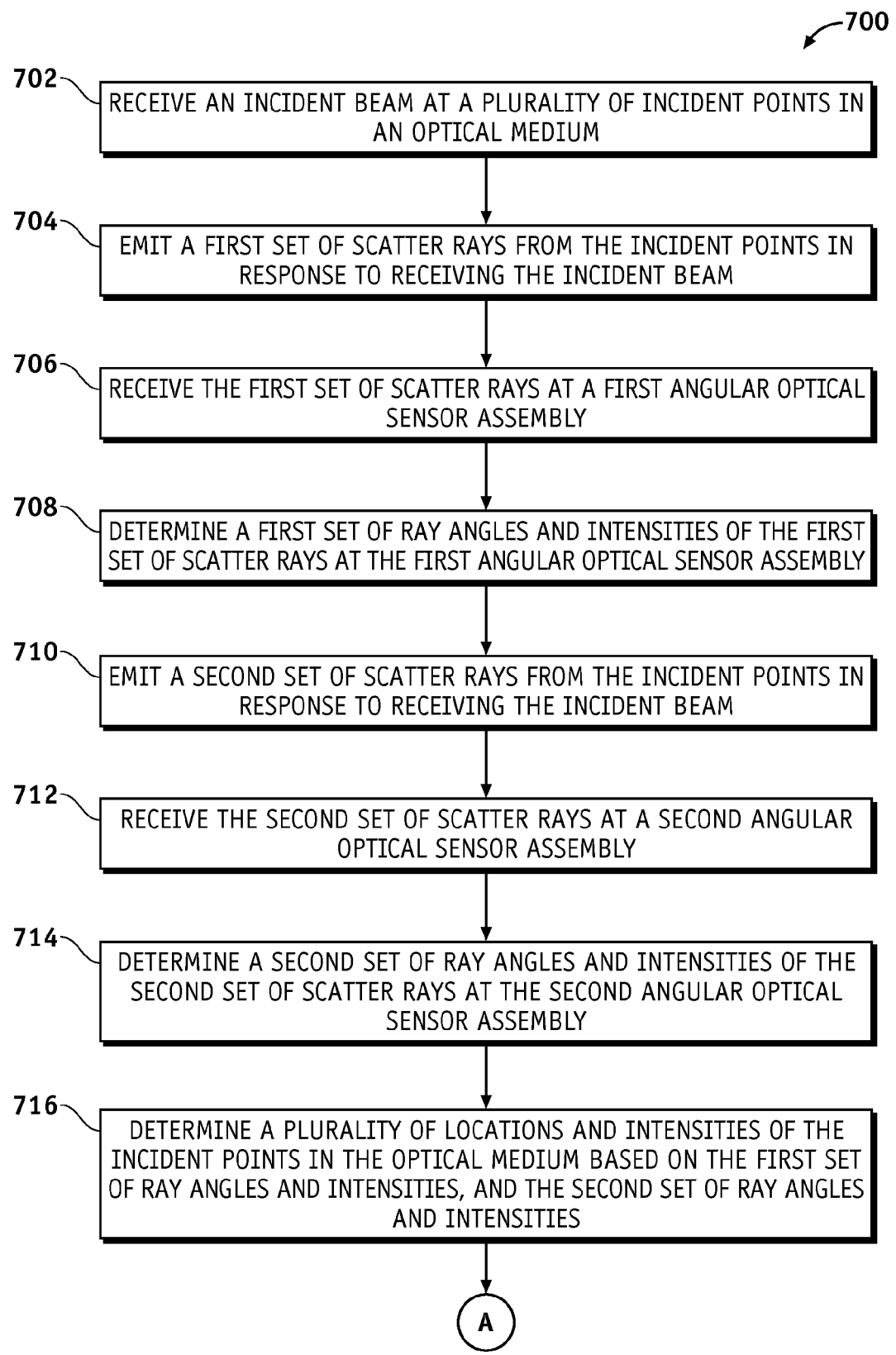
FIG. 7 is an illustration of an exemplary flowchart showing a telecentric angular optical detection process according to an embodiment of the disclosure.
Figure 7:
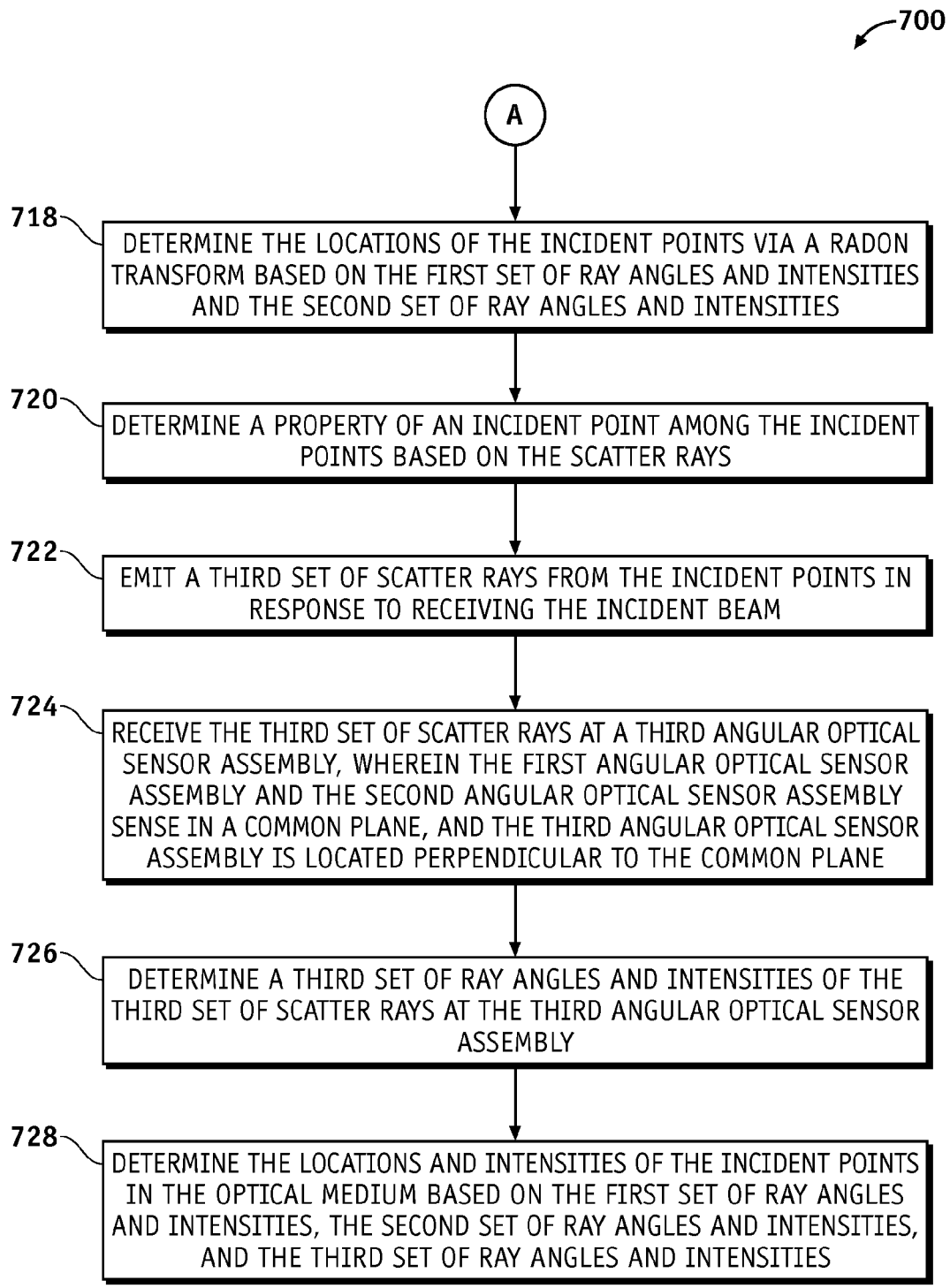

FIG. 7 is an illustration of an exemplary flowchart showing a telecentric angular optical detection process 700 (process 700) according to an embodiment of the disclosure. The various tasks performed in connection with the process 700 may be performed mechanically, by software, hardware, firmware, a computer-readable medium having computer executable instructions for performing the processes methods, or any combination thereof.

It should be appreciated that process 700 may include any number of additional or alternative tasks, the tasks shown in FIG. 7 need not be performed in the illustrated order, and the process 700 may be incorporated into a more comprehensive procedure or process having additional functionality not described in detail herein. For illustrative purposes, the following description of process 700 may refer to elements mentioned above in connection with FIGS. 1-6.

In practical embodiments, portions of the process 700 may be performed by different elements of the system 600 such as: the angular optical sensor assembly-1 602, the angular optical sensor assembly-N 616, the coupling logic 618, and the tomography module 624, etc. Process 700 may have functions, material, and structures that are similar to the embodiments shown in FIGS. 1-6. Therefore, common features, functions, and elements may not be redundantly described here.

Process 700 may begin by receiving an incident beam such as the incident beam 102 at the incident points 126 in a medium such as the optical medium 104 (task 702).

Process 700 may continue by the optical medium 104 emitting a first set of scatter rays such as the first set-of-scatter rays 116 from the incident points 126 in response to receiving the incident beam 102 (task 704).

Process 700 may continue by receiving the first set-of-scatter rays 116 at a first angular optical sensor assembly such as the first angular optical sensor assembly 108 (task 706).

Process 700 may continue by the tomography module 624 determining a first set of ray angles and intensities of the first set-of-scatter rays 116 at the first angular optical sensor assembly 108 (task 708).

Process 700 may continue by the optical medium 104 emitting a second set of scatter rays such as the second set-of-scatter rays 118 from the incident points 126 in response to receiving the incident beam 102 (task 710).

Process 700 may continue by receiving the second set-of-scatter rays 118 at a second angular optical sensor assembly such as the second angular optical sensor assembly 112 (task 712).

Process 700 may continue by the tomography module 624 determining a second set of ray angles and intensities of the second set-of-scatter rays 118 at the second angular optical sensor assembly 112 (task 714).

Process 700 may continue by the tomography module 624 determining a plurality of locations and intensities of the incident points 126 in the optical medium 104 based on the first set of ray angles and intensities, and the second set of ray angles and intensities (task 716).

Process 700 may continue by the tomography module 624 determining the locations of the incident points 126 via a Radon transform based on the first set of ray angles and intensities and the second set of ray angles and intensities (task 718).

Process 700 may continue by the tomography module 624 determining a property of the incident point 106 among the incident points 126 based on the scatter rays (task 720).

Process 700 may continue by emitting a third set of scatter rays such as the scatter rays 202 from the incident points 126 in response to the receiving the incident beam 102 (task 722).

Process 700 may continue by receiving the third set of scatter rays at a third angular optical sensor assembly (not shown) (task 724). The first angular optical sensor assembly 108 and the second angular optical sensor assembly 112 may sense in a common plane 124 (FIG. 1), and the third angular optical sensor assembly is located perpendicular to the common plane 124.

Process 700 may continue by the tomography module 624 determining a third set-of-ray angles and intensities of the third set-of-scatter rays at the third angular optical sensor assembly (task 726).

Process 700 may continue by the tomography module 624 determining the locations and intensities of the incident points 126 in the optical medium 104 based on the first set-of-ray angles and intensities 128, the second set-of-ray angles and intensities 130, and the third set-of-ray angles and intensities (task 728).

Figure 8:
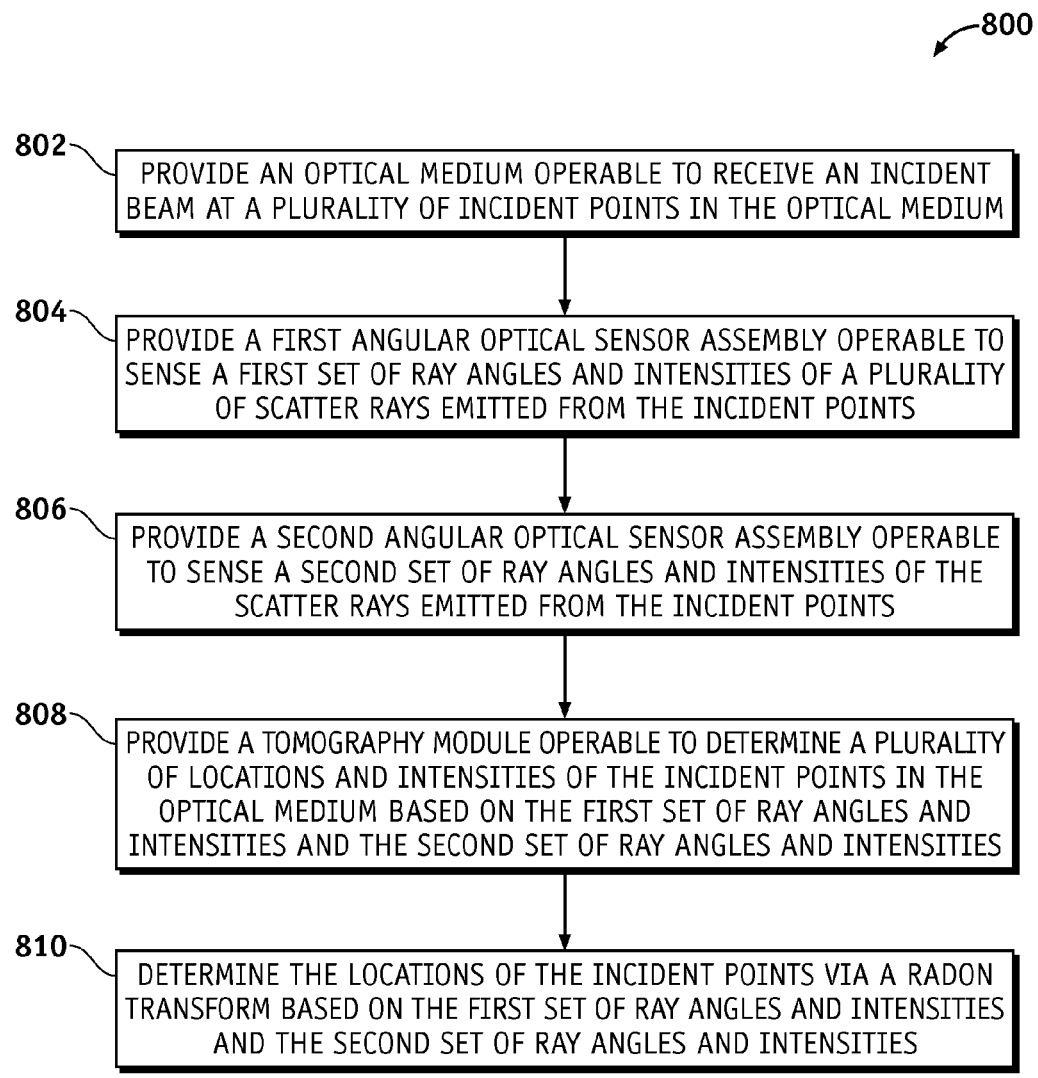
FIG. 8 is an illustration of an exemplary flowchart showing a process for providing a tomographic optical beam irradiance sensor system according to an embodiment of the disclosure.

FIG. 8 is an illustration of an exemplary flowchart showing a process 800 for providing a tomographic optical beam irradiance sensor system according to an embodiment of the disclosure. The various tasks performed in connection with process 800 may be performed mechanically, by software, hardware, firmware, a computer-readable medium having computer executable instructions for performing the processes methods, or any combination thereof. For illustrative purposes, the following description of the process 800 may refer to elements mentioned above in connection with FIGS. 1-6.

It should be appreciated that the process 800 may include any number of additional or alternative tasks, the tasks shown in FIG. 8 need not be performed in the illustrated order, and the process 800 may be incorporated into a more comprehensive procedure or process having additional functionality not described in detail herein. In practical embodiments, portions of the process 800 may be performed by different elements of the system 600 such as: the angular optical sensor assembly-1 602, the angular optical sensor assembly-N 616, the coupling logic 618, and the tomography module 624, etc. Process 800 may have functions, material, and structures that are similar to the embodiments shown in FIGS. 1-6. Therefore, common features, functions, and elements may not be redundantly described here.

Process 800 may begin by providing an optimal medium such as the optical medium 104 operable to receive the incident beam 102 at a plurality of incident points 126 in the optical medium 104 (task 802).

Process 800 may continue by providing a first angular optical sensor assembly such as the first angular optical sensor assembly 108 operable to sense a first set-of-ray angles and intensities of a plurality of scatter rays emitted from the incident points 126 (task 804).

Process 800 may continue by providing a second angular optical sensor assembly such as the second angular optical sensor assembly 112 operable to sense a second set-of-ray angles and intensities of the scatter rays emitted from the incident points 126 (task 806).

Process 800 may continue by providing the tomography module 624 operable to determine to determine a plurality of locations and intensities of the incident points 126 in the optical medium 104 based on the first set-of-ray angles and intensities and the second set-of-ray angles and intensities (task 808).

Process 800 may continue by the tomography module 624 determining the locations of the incident points 126 via a Radon transform based on the first set-of-ray angles and intensities and the second set-of-ray angles and intensities (task 810).

In this manner, embodiments of the disclosure provide a tomographic optical beam irradiance sensor.

Existing solutions have geometric limitations that are solved according to the embodiments. For example, the embodiments allow sensing a light beam on a flying target without a need for a 2-D array or a target for which an imaging sensor cannot be conveniently located away from a scattering target region. This was previously accomplished by the use of an array of direct or filtered detectors or by imaging scatter of a light beam from a target plate or assembly.

Use of the array of direct or filtered detectors, makes manufacturing complexity of the existing systems expensive and long-lead. In using the imaging scatter of the light beam from the target plate or assembly, a location for an imaging sensor must be provided that is not coplanar with the sensed region. This task is difficult for an object like a missile due to aerodynamics and other objects because the sensor can interfere with the target image.

In contrast, use of telecentric optical systems according to embodiments of the disclosure assure that scatter from adjacent regions does not reach a particular angular sensing direction of an angular optical sensor assembly. Embodiments of the disclosure read out data in a configuration that is particularly convenient for telemetry and for which detector assemblies are easy to manufacture.

In this document, the terms "computer program product", "computer-readable medium", "computer readable storage medium", and the like may be used generally to refer to media such as, for example, memory, storage devices, or storage unit. These and other forms of computer-readable media may be involved in storing one or more instructions for use by the processor module 620 to cause the processor module 620 to perform specified operations. Such instructions, generally referred to as "computer program code" or "program code" (which may be grouped in the form of computer programs or other groupings), when executed, enable power utilization scheduling methods of the system 600.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 2-6 depict example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

As used herein, unless expressly stated otherwise, "operable" means able to be used, fit or ready for use or service, usable for a specific purpose, and capable of performing a recited or desired function described herein. In relation to systems and devices, the term "operable" means the system and/or the device is fully functional and calibrated, comprises elements for, and meets applicable operability requirements to perform a recited function when activated. In relation to systems and circuits, the term "operable" means the system and/or the circuit is fully functional and calibrated, comprises logic for, and meets applicable operability requirements to perform a recited function when activated.

The invention claimed is:

1. A tomographic optical beam irradiance sensor system comprising:
   an optical medium operable to receive an incident beam at a plurality of incident points in the optical medium;
   a first angular optical sensor assembly operable to sense a first set of ray angles and intensities of a plurality of scatter rays emitted from the incident points;
   a second angular optical sensor assembly operable to sense a second set of ray angles and intensities of the scatter rays emitted from the incident points; and
   a tomography module operable to determine a plurality of locations and intensities of the incident points in the optical medium based on the first set of ray angles and intensities and the second set of ray angles and intensities.

2. The tomographic optical beam irradiance sensor according to claim 1, wherein the optical medium is further operable to scatter an emitted ray of the scatter rays at a scatter ray frequency that is different from an incident beam frequency of the incident beam.

3. The tomographic optical beam irradiance sensor according to claim 1, wherein the tomography module is further operable to determine the locations of the incident points via a Radon transform based on the first set of ray angles and intensities and the second set of ray angles and intensities.

4. The tomographic optical beam irradiance sensor according to claim 1, wherein the tomography module is further operable to determine a property of an incident point among the incident points based on the scatter rays.

5. The tomographic optical beam irradiance sensor according to claim 4, wherein the property comprises at least one member selected from the group consisting of: a temperature of the incident point, and a spectrum of the incident point.

6. The tomographic optical beam irradiance sensor according to claim 1, wherein the first angular optical sensor assembly and the second angular optical sensor assembly comprise an angular optical sensor assembly comprising:
   an aperture operable to collimate the scatter rays;
   a telecentric lens operable to direct a received ray of the scatter rays to a sensor corresponding to a direction of the received ray; and
   a detector array operable to detect the received ray.

7. The tomographic optical beam irradiance sensor according to claim 1, further comprising:
   a third angular optical sensor assembly operable to sense a third set of ray angles and intensities of the scatter rays emitted from the incident points, wherein:
   the first angular optical sensor assembly and the second angular optical sensor assembly sense in a common plane, and the third angular optical sensor assembly is located perpendicular to the common plane; and
   the tomography module is further operable to determine the locations and intensities of the incident points in the optical medium based on the first set of ray angles and intensities, the second set of ray angles and intensities, and the third set of ray angles and intensities.

8. The tomographic optical beam irradiance sensor according to claim 1, wherein the optical medium comprises at least one member selected from the group consisting of: an acrylic medium, a fused silica medium, a scattering medium, a fogged scattering medium, a particulate comprising scattering medium, an ion-implanted scattering medium, an absorptive medium, and an anti-stokes conversion medium.

9. A method for optical detection, the method comprising:
receiving an incident beam at a plurality of incident points in an optical medium;
emitting a first set of scatter rays from the incident points in response to receiving the incident beam;
receiving the first set of scatter rays at a first angular optical sensor assembly;
determining a first set of ray angles and intensities of the first set of scatter rays at the first angular optical sensor assembly;
emitting a second set of scatter rays from the incident points in response to receiving the incident beam;
receiving the second set of scatter rays at a second angular optical sensor assembly;
determining a second set of ray angles and intensities of the second set of scatter rays at the second angular optical sensor assembly; and
determining a plurality of locations and intensities of the incident points in the optical medium based on the first set of ray angles and intensities and the second set of ray angles and intensities.

10. The method according to claim 9, wherein the optical medium is operable to scatter an emitted ray of the scatter rays at a scatter ray frequency that is different from an incident beam frequency of the incident beam.

11. The method according to claim 9, further comprising determining the locations of the incident points via a Radon transform based on the first set of ray angles and intensities and the second set of ray angles and intensities.

12. The method according to claim 9, further comprising determining a property of an incident point among the incident points based on the scatter rays.

13. The method according to claim 12, wherein the property comprises at least one member selected from the group consisting of: a temperature of the incident point, and a spectrum of the incident point.

14. The method according to claim 9, wherein the first angular optical sensor assembly and the second angular optical sensor assembly comprise an angular optical sensor assembly comprising:
an aperture operable to collimate the scatter rays;
a telecentric lens operable to direct a received ray of the scatter rays to a sensor corresponding to a direction of the received ray; and
a detector array operable to detect the received ray.

15. The method according to claim 9, wherein the optical medium comprises at least one member selected from the group consisting of: an acrylic medium, a fused silica medium, a scattering medium, a fogged scattering medium, a particulate comprising scattering medium, an ion-implanted scattering medium, an absorptive medium, and an anti-stokes conversion medium.

16. The method according to claim 9, further comprising:
emitting a third set of scatter rays from the incident points in response to receiving the incident beam;
receiving the third set of scatter rays at a third angular optical sensor assembly, wherein the first angular optical sensor assembly and the second angular optical sensor assembly sense in a common plane, and the third angular optical sensor assembly is located perpendicular to the common plane;
determining a third set of ray angles and intensities of the third set of scatter rays at the third angular optical sensor assembly; and
determining the locations and intensities of the incident points in the optical medium based on the first set of ray angles and intensities, the second set of ray angles and intensities, and the third set of ray angles and intensities.

17. A method for providing a tomographic optical beam irradiance sensor system, the method comprising:
providing an optical medium operable to receive an incident beam at a plurality of incident points in the optical medium;
providing a first angular optical sensor assembly operable to sense a first set of ray angles and intensities of a plurality of scatter rays emitted from the incident points;
providing a second angular optical sensor assembly operable to sense a second set of ray angles and intensities of the scatter rays emitted from the incident points; and
providing a tomography module operable to determine a plurality of locations and intensities of the incident points in the optical medium based on the first set of ray angles and intensities and the second set of ray angles and intensities.

18. The method according to claim 17, wherein the optical medium is operable to scatter an emitted ray of the scatter rays at a scatter ray frequency that is different from an incident beam frequency of the incident beam.

19. The method according to claim 17, further comprising determining the locations of the incident points via a Radon transform based on the first set of ray angles and intensities and the second set of ray angles and intensities.

20. The method according to claim 17, wherein the first angular optical sensor assembly and the second angular optical sensor assembly comprise an angular optical sensor assembly comprising:
an aperture operable to collimate the scatter rays;
a telecentric lens operable to direct a received ray of the scatter rays to a sensor corresponding to a direction of the received ray; and
a detector array operable to detect the received ray.

* * * * *